United States Patent
Patton et al.

(10) Patent No.: US 7,749,384 B2
(45) Date of Patent: Jul. 6, 2010

(54) DE-NITRIFICATION TREATMENT SYSTEM AND METHOD

(76) Inventors: David W. Patton, 185 Elk La., Avon, CO (US) 81620; Gerald Lee Lamb, 2484 Peakview Ct., Littleton, CO (US) 80120; Jamie Lee Miller, 6320 Cole Ct., Arvada, CO (US) 80004

( * ) Notice: Subject to any disclaimer, the term of this patent is extended or adjusted under 35 U.S.C. 154(b) by 0 days.

(21) Appl. No.: 12/125,798

(22) Filed: May 22, 2008

(65) Prior Publication Data

US 2008/0314825 A1 Dec. 25, 2008

Related U.S. Application Data

(60) Provisional application No. 60/939,651, filed on May 23, 2007.

(51) Int. Cl.
*C02F 3/28* (2006.01)
(52) U.S. Cl. .................. 210/617; 210/150; 210/170.08; 210/903
(58) Field of Classification Search ................. 210/616, 210/617, 150, 151, 170.08, 903
See application file for complete search history.

(56) References Cited

U.S. PATENT DOCUMENTS

| | | | | |
|---|---|---|---|---|
| 3,829,377 | A * | 8/1974 | Hashimoato ................. | 210/617 |
| 4,465,594 | A * | 8/1984 | Laak ........................ | 210/151 |
| 4,895,645 | A * | 1/1990 | Zorich, Jr. .................. | 210/150 |
| 5,288,407 | A | 2/1994 | Bodwell et al. | |
| 5,318,699 | A | 6/1994 | Robertson et al. | |
| 5,618,413 | A * | 4/1997 | Todd et al. .................. | 210/151 |
| 5,908,555 | A * | 6/1999 | Reinsel et al. .............. | 210/617 |
| 6,531,062 | B1 | 3/2003 | Whitehill | |
| 6,540,910 | B2 * | 4/2003 | Schwarzenegger et al. .. | 210/151 |
| 6,565,750 | B2 | 5/2003 | Nasr et al. | |
| 7,081,203 | B2 * | 7/2006 | Helm ......................... | 210/617 |
| 7,323,107 | B2 | 1/2008 | Ames et al. | |
| 7,407,577 | B2 | 8/2008 | Kerns | |

OTHER PUBLICATIONS

"Results of Search in US Patent Collection db for: SPEC/ (((heterotrophic and denitr$) and (Sewage or Septic)) and (Bed and Flow)): 41 patents", Patent Database Search Results: USPTO Patent Full-Text and Image Database, available at http://patft.uspto.gov/netacgi/nph-Parser?Sect1=Parser?Sect1=PTO2&Sect2=HITOFF&u=%2FnetahtmL%2FPTO%2Fsearch-adv.htm&r=0&..., printed on Nov. 15, 2007, pp. 1-3.

(Continued)

*Primary Examiner*—Christopher Upton
(74) *Attorney, Agent, or Firm*—Sheridan Ross P.C.

(57) ABSTRACT

An apparatus is provided that includes:
a containment system 208 having at least one sidewall and bottom that are substantially impermeable to a passage of water;
a distribution system 124 to introduce an aqueous stream comprising nitrates into the containment system;
a de-nitrification system 128 comprising a de-nitrification media, the media being contained within the containment system;
a pump to pressurize the stream and cause the stream to pass through the de-nitrification media, thereby converting at least most of the nitrates into nitrogen gas and forming a treated stream; and
a collection system 132 to remove the treated stream from the containment system.

22 Claims, 2 Drawing Sheets

OTHER PUBLICATIONS

"Results of Search in PGPUB Production Database for: SPEC/ ((denitr$ and (sewage or septic)) and (impervious and((((((barrier or wall) or top) or enclosure) or chamber) or structur$)or material))): 12 applications", PreGrant Publication Database Search Results: USPTO Patent Full-Text and Image Database, available at http://appft1.uspto.gov/netacgi/nph-Parser?Sect1=PTO2&Sect2= HITOFF&p=1&u=%2Fnetahtml%2FPTO%2Fsearch-adv.html..., printed Mar. 10, 2008, p. 1.

"Results of Search in US Patent Collection db for: SPEC/((denitr$ and (impervious and (((((barrier or wall) or top) or enclosure) or structure$) or material))): 49 patents", Patent Database Search Results: USPTO Patent Full-Text and Image Database, available at http://patft.uspto.gov/netacgi/nph-Parser?Sect1=Parser?Sect1= PTO2&Sect2=HITOFF&u=%2Fnetahtml%2FPTO%2Fsearch-adv. htm&r=0&..., printed Nov. 16, 2007, pp. 1-3.

"Results of Search in US Patent Collection db for: SPEC/((denitr$ and (sewage or septic)) and (impervious and ((((((barrier or wall) or top) or enclosure) or chamber) or structur$) or material))): 18 patents", Patent Database Search Results: USPTO Patent Full-Text and Image Database, available at http://patft.uspto.gov/netacgi/nph-Parser?Sect1=Parser?Sect1=PTO2&Sect2=HITOFF&u=% 2Fnetahtml%2FPTO%2Fsearch-adv.htm&r=0&..., printed on Nov. 16, 2007, pp. 1-2.

"Results of Search in US Patents Text Collection db for: SPEC/ ((((heterotrophic and denitr$) and (sewage or septic)) and (granular and bed)) and (multiple and (header or piping))): 0 patents", Patent Database Search Results: USPTO Patent Full-Text and Image Database, available at http://patft.uspto.gov/netacgi/nph-Parser?Sect1=PTO2&Sect2=HITOFF&u=%2Fnetahtml%2FPTO% 2Fsearch-adv.htm&r=0&..., printed Nov. 16, 2007, p. 1.

"Results of Search in US Patent Collection db for: Spec/ ((((heterotrophic and denitr$) and (sewage or septic)) and ((((granular or packed) or media) or particle) and bed)) and (multiple and (header or piping))): 5 patents", Patent Database Search Results: USPTO Patent Full-Text and Image Database, available at http:// patft.uspto.gov/netacgi/nph-Parser?Sect1=PTO2&Sect2+ HITOFF& u=%2Fnetahtml%2FPTO%2Fsearch-adv.htm&r=0&..., printed on Nov. 16, 2007, p. 1.

"Results of Search in US Patent Collection db for: SPEC/ ((heterotrophic and denitr$) and (sewage or septic)): 115 patents", Patent Database Search Results: USPTO Patent Full-Text and Image Database, available at http://patft.uspto.gov/netacgi/nph- Parser?Sect1=PTO2&Sect2=HITOFF&u=%2FPTO%2Fsearch- adv.htm&r=0&f..., printed on Jun. 22, 2007, pp. 1-8.

"Results of Search in US Patent Collection db for: SPEC/ (((heterotrophic and denitr$) and (sewage or septic)) and (multiple and ((pipe or piping) or head$))): 25 patents", Patent Database Search Results: USPTO Patent Full-Text and Image Database, available at http://patft.uspto.gov/netacgi/nph-Parser?Sect1=PTO2&Sect2= HITOFF&u%2Fnetahtml%2FPTO%2Fsearch-adv.htm&r=0&..., printed Nov. 16, 2007, pp. 1-2.

"Results of Search in US Patent Collection db for: SPEC/ (((heterotrophic and denitr$) and (sewage or septic)) and (bed and (distribut$ and system))): 27 patents", Patent Database Search Results: USPTO Patent Full-Text and Image Database, available at http://patft.uspto.gov/netacgi/nph-Parser?Sect1=PTO2Sect2= HITOFF&u=%2Fnetahtml%2FPTO%2Fsearch-adv.htm&r=0&..., printed on Nov. 16, 2007, pp. 1-2.

"Results of Search in US Patent Collection db for: REF/5520812", Patent Database Search Results: USPTO Patent Full-Text and Image Database, available at http://patft.uspto.gov/netacgi/nph- Parser?Sect1=PTO2&Sect2=HITOFF&u=%2Fnetahtml% 2FPTO%2Fsearch-adv.htm&r=0&..., printed on Nov. 15, 2007, p. 1.

"Results of Search in US Patent Collection REF/5833856", Patent Database Search Results: USPTO Patent Full-Text and Image Database, available at http://patft.uspto.gov/netacgi/nph- Parser?Sect1=PTO2&Sect2=HITOFF&u=%2FPTO%2Fsearch- adv.htm&r=0&..., printed Nov. 15, 2007, pp. 1-2.

"Results of Search in US Patent Collection db for: SPEC/ (((heterotrophic and denitr$) and (sewage or septic)) ANDF (flow and Uniform))", Patent Database Search Results: USPTO Patent Full- Text and Image Database, available at http://patft.uspto.gov/netacgi/ nph-Parser?Sect1=PTO2&Sect2=HITOFF&u=%2Fnetahtml% 2FPTO%2Fsearch-adv.htm&r=0&..., printed Nov. 15, 2007, pp. 1-1.

International Search Report for International (PCT) Patent Application No. PCT/US08/64567, mailed Aug. 21, 2008.

Written Opinion for International (PCT) Patent Application No. PCT/US08/64567, mailed Aug. 21, 2008.

Background for the above captioned application (previously provided).

International Preliminary Report on Patentability for International (PCT) Patent Application No. PCT/US08/64567, mailed Dec. 3, 2009.

* cited by examiner

US 7,749,384 B2

DE-NITRIFICATION TREATMENT SYSTEM AND METHOD

CROSS REFERENCE TO RELATED APPLICATION

The present application claims the benefits of U.S. Provisional Application Ser. No. 60/939,651, filed May 23, 2007, entitled "Denitro Treatment Process", which is incorporated herein by this reference in its entirety.

FIELD

The invention relates generally to de-nitrification of aqueous streams and particularly to de-nitrification of nitrified wastewater effluent.

BACKGROUND

Processes used to treat the wastewater discharged from primary and/or secondary treatment processes are referred to as "advanced" treatment systems. Advanced treatment systems reduce the biological nutrient content in the wastewater. One of the most significant biological nutrients is nitrogen.

Nitrogen-containing species, a common byproduct of the decomposition of organic matter, can be an environmentally controlled substance. By way of example, ammonia ($NH_3$) not only imposes an oxygen demand on the water in which it is discharged but also at high enough concentrations can be toxic to aquatic life. Nitrite ($NO_2$) can be toxic if ingested by vertebrate forms of life. Nitrate ($NO_3$) can be toxic to living organisms if ingested at high enough levels. In particular, nitrate is believed to be toxic to infants through a condition known as infant methemoglobinemia. Under the chemical conditions unique to an infant's stomach, nitrate is converted into nitrite. Nitrite interferes with the role of hemoglobin in the respiratory and metabolic functions. Finally, nitrogen-containing species can act as a plant nutrient, stimulating undesirable growth of algae and other aquatic plant life.

A typical wastewater disposal system for treating nitrogenated wastewater from a septic tank includes an outlet pipe leading to a dispersal manifold. The dispersal manifold includes a collection of porous pipes through which the wastewater seeps out. The manifold disperses the wastewater over a bed of soakaway material or leachfield, such as gravel/sand. The ammonium, present in the septic tank, reacts under the aerobic conditions prevailing in the soakaway to nitrate, which then passes through the soakaway into the groundwater.

Removal of nitrogen from septic tank wastewater is actually a two step process. The first step, called nitrification, requires conversion, in the soakaway, of the nitrogen in ammonia to nitrogen in nitrates. This is accomplished by the use of aerobic bacteria; nitrosomonas and nitrobacter, that are already present in domestic wastewater. These bacteria grow and multiply in the presence of dissolved molecular oxygen at concentrations greater than about 1 milligram per liter. The bacteria convert ammonia nitrogen into nitrate nitrogen. The second step, called de-nitrification, converts the nitrate nitrogen into gaseous nitrogen. This is accomplished by (other) heterotrophic bacteria naturally present in the wastewater. Using nitrate as an oxygen source, these bacteria consume carbon, thereby converting nitrates to gaseous nitrogen, but only under the molecular oxygen-depleted conditions in which the dissolved molecular oxygen concentration is below about 1 milligram per liter. When this condition is met, the bacteria generate gaseous nitrogen from the nitrates, and the nitrogen is released harmlessly into the atmosphere.

U.S. Pat. No. 5,318,699 is an example of a conventional system for nitrifying and denitrifying septic tank wastewater. In the system, nitrogenated wastewater, discharged from the aerobic soakaway (which is composed of gravel), seeps downwards and passes through a body of organic carbon. The carbon ostensibly is under anaerobic conditions, causing de-nitrification to occur. The resulting carbon dioxide and nitrogen gases migrate upwards through the soakaway and are discharged into the atmosphere.

Although this system may be effective in reducing nitrogen levels in wastewater, it has drawbacks. For example, molecular oxygen can migrate into the body of carbon, thereby interfering with de-nitrification. Particulate matter in the wastewater can be carried by the wastewater into the soakaway. The particulate matter, through silting, can clog porous channels in the soakaway and body of organic carbon, thereby causing channeling of the wastewater through the organic carbon. Channeling, in turn, can reduce the level of conversion of nitrogen species into nitrogen gas. That is, the wastewater passing from the carbon body into the surrounding water table can contain high levels of nitrogen species.

Other systems either re-circulate nitrified nitrate-laden effluent to the anoxic and carbon-laden front of the treatment process for de-nitrification or pass nitrified effluent through a post secondary treatment anoxic process with the addition of a carbon source, such as methanol to the process.

SUMMARY

These and other needs are addressed by the various embodiments and configurations of the present invention. The present invention is directed to a de-nitrification system and process in which an aqueous stream (effluent from an advanced treatment wastewater system), including nitrogen-containing inorganic and organic compounds, is contacted with a, preferably carbonaceous or carbon-containing, de-nitrification media, which reduces the organic compounds to nitrogen gas, carbon dioxide gas, and water.

In one embodiment, a de-nitrification method is provided that includes the steps:

(a) receiving (such as from a soakaway) an aqueous stream comprising nitrates;

(b) introducing the aqueous stream into a containment system, the containment system including a de-nitrification media and having one or more sidewalls and a bottom that are substantially impermeable to the passage of molecular oxygen;

(c) passing the stream through the de-nitrification media to convert most, if not all, of the nitrates into nitrogen gas and form a treated stream; and (d) removing the treated stream from the containment system.

In one configuration, the influent stream is delivered via a mechanical means (e.g., pump) and upflowed through the de-nitrification media under anaerobic conditions, thereby converting nitrate to nitrogen gas.

In another embodiment, a de-nitrification assembly is provided that includes:

(a) a containment system having one or more sidewalls and a bottom that are substantially impermeable to a passage of water;

(b) a distribution system to introduce an aqueous stream comprising nitrates into the containment system;

(c) a de-nitrification system including a de-nitrification media, the media being contained within the containment system;

(d) a pump to pressurize the stream and cause the stream to pass through the de-nitrification media, thereby converting most, if not all, of the nitrates into nitrogen gas and forming a treated stream; and (e) a collection system to remove the treated stream from the containment system.

In one configuration, the assembly includes a lined vessel having influent distribution and effluent collection systems positioned at the bottom and top of the vessel, respectively. A porous non-carbonaceous media surrounds the distribution and collection systems, with the carbonaceous de-nitrification media being positioned there between. The distribution and collection systems include a series of interlaced or inter-digitated pipes having multiple discharge and collection ports positioned along each branch.

In yet another embodiment, a construction method is provided that includes the steps:

(a) forming an underground excavation;

(b) positioning a containment system in the underground excavation, the containment system including a sidewall and a bottom that are substantially impermeable to a passage of water;

(c) positioning, in the containment system, a distribution system to introduce an aqueous stream including nitrates into the containment system;

(d) positioning, in the containment system, a de-nitrification system including a de-nitrification media, the media being contained within the containment system;

(e) connecting, to the distribution system, a pump to pressurize the stream and cause the stream to pass through the de-nitrification media, thereby converting most, if not all, of the nitrates into nitrogen gas and forming a treated stream; and (f) positioning, in the containment system, a collection system to remove the treated stream from the containment system.

The present invention can provide a number of advantages depending on the particular configuration. It can effectively, inexpensively, and continuously de-nitrify nitrogen-containing wastewaters, such as effluent from an advanced treatment system. By passing a nitrified effluent through an anaerobic upflow system with a carbonaceous media, it can eliminate the need for carbon addition to the de-nitrification step. By providing an impervious containment system, it can inhibit the ingress of molecular oxygen into the de-nitrification media, thereby enhancing the anaerobic de-nitrification process. The impervious containment system can also inhibit the passage of groundwater into the containment system and of the wastewaters into the surrounding soils. In the absence of the containment system, nitrogen-containing wastewaters can be discharged into the groundwater, before de-nitrification is completed. By using an artificial pressure source, rather than simply relying on gravity flow, channeling can be substantially minimized. This is particularly true when the de-nitrification media is fluidized by the wastewater.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present invention(s). These drawings, together with the description, explain the principles of the invention(s). The drawings simply illustrate preferred and alternative examples of how the invention(s) can be made and used and are not to be construed as limiting the invention(s) to only the illustrated and described examples. Further features and advantages will become apparent from the following, more detailed, description of the various embodiments of the invention(s), as illustrated by the drawings referenced below.

DETAILED DESCRIPTION

In one embodiment, wastewater is de-nitrified following nitrification.

Figure 1:
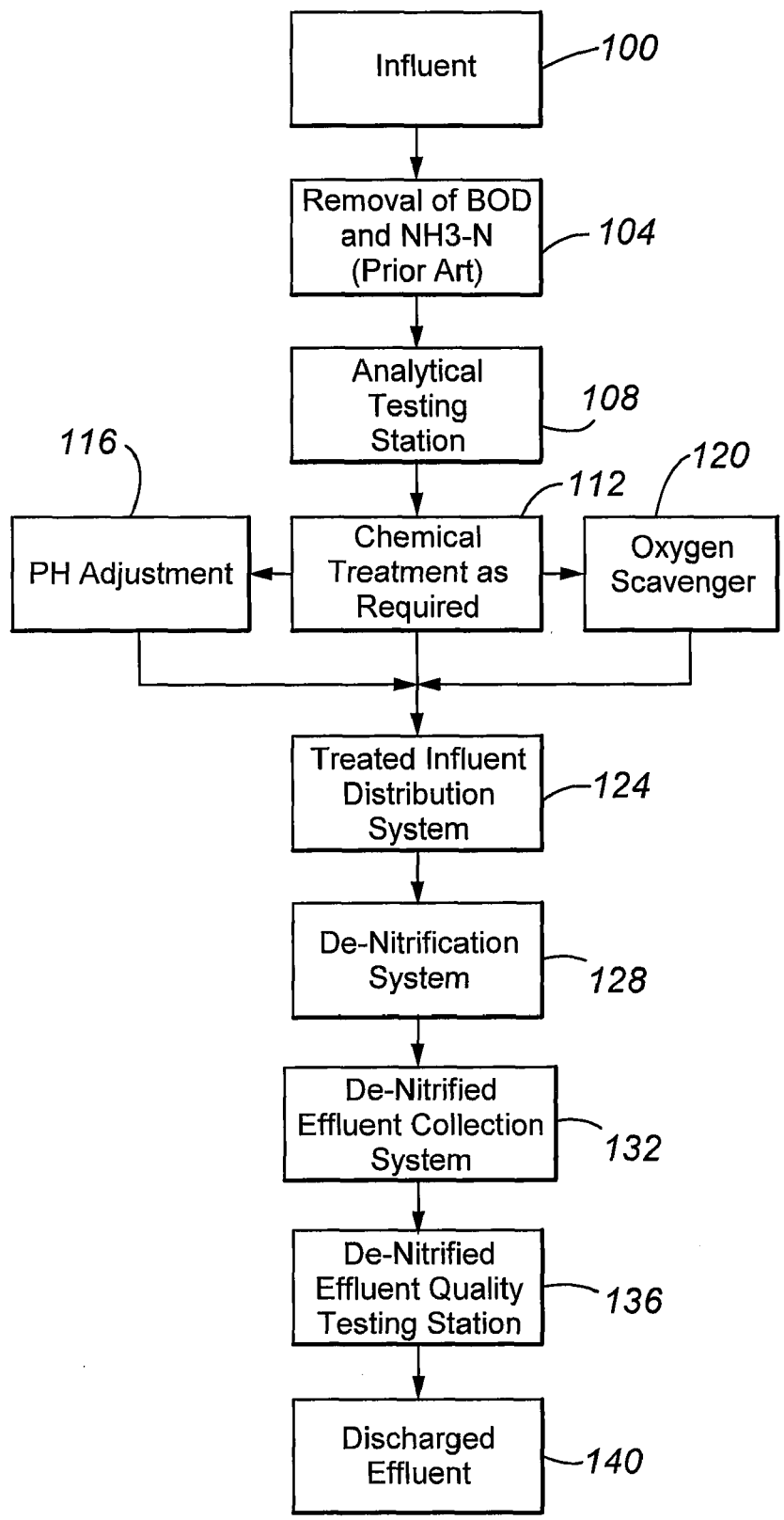
FIG. 1 is a plan view of the de-nitrification system according to an embodiment.
Figure 2:
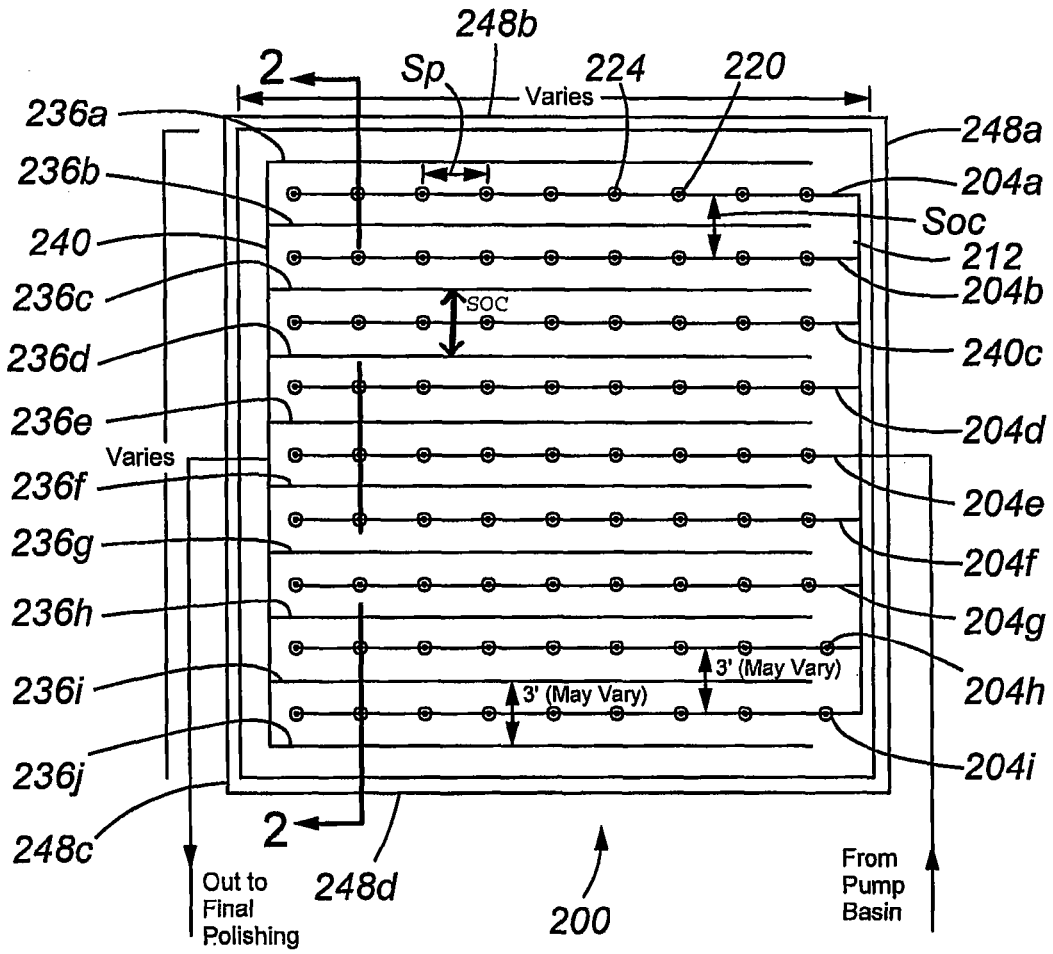
FIG. 2 is a cross-section taken along line 2-2 of FIG. 2.

Referring to FIGS. 1-2, a configuration of a de-nitrification assembly 200 is depicted. The assembly 200 includes a treated influent (e.g., nitrified wastewater) distribution system 124, de-nitrification system 128, de-nitrified effluent collection system 132, and containment system 208.

The treated influent distribution system 124 includes a plurality of substantially parallel and spaced-apart flow distribution conduits 204a-i connected to an influent manifold 212, all of which is contained within a porous distribution media 216. In one configuration, each of the conduits 204a-i includes a plurality of spaced-apart discharge ports 220, which may include a concave or semi-spherical deflector shield 224 to direct the discharged influent downwards and outwards in a 360 degree pattern. The combination of spaced-apart flow distribution conduits 204a-i and spaced-apart ports 220 having deflector shields 224 can provide a substantially uniform distribution of the influent over the areal extent of the interface 228 between the porous media 216 and de-nitrification media 128.

The various components of the distribution system 124 are typically not chemically reactive with, or are inert to, the influent. Commonly, the manifold 212 and conduits 204a-i are composed of one or more of concrete, clay, wood, various plastics, such as polyvinyl, polypropylene or polyethylene, fiberglass, rubber, copper, steel or other metals. The porous media 216 is commonly geologically rounded rock, quarry rock, residuals from metallurgical processing, or plastics, or other materials that are resistant to erosion or chemical degradation. The purpose of the granular material is to induce a uniform wastewater flow pattern into the reactive carbon containing bed and thus prevent short-circuiting and erosion of the carbon bed material.

In one particular implementation, the spacing $S_{DC}$ (which is a function of influent pressure, flow rate, and discharge port orifice size and spacing) between adjacent distribution conduits preferably ranges from about 2 to about 4 feet, the influent pressure from about 15 to about 40 psi, the influent flow rate from about 10 to about 45 gal/min, the discharge port orifice size from about ⅛" to about ½" inches, and the port spacing $S_p$ from about 2 to about 4 inches. The diameter of the conduits 204a-i preferably ranges from about 1 to about 3 inches. The distribution size of at least most of the porous media 216 preferably ranges from about 0.5 to about 2.0 inches but can be outside of this range depending on the material used for the media.

While the distribution system 124 has been described with reference to a particular configuration, it is to be appreciated that other configurations are possible. For example, more or fewer conduits 204 and/or discharge ports 220 may be employed. The distribution conduits 204 can, for instance, be perforated pipes. The free ends of each conduit 204 can be connected to a second manifold. All such variations are considered to part of the current invention.

The de-nitrification system 128 includes de-nitrification media 228 and porous and permeable separator 232 at the interface between the porous media 216 and de-nitrification media 228. By using an upflow configuration of the wastewater passing through the de-nitrification media 228, the de-nitrification system 128 is able to operate consistently under substantially anaerobic or anoxic conditions. This can improve the level of conversion of dissolved nitrogen species into nitrogen gas.

The de-nitrification media 228 is porous and permeable to upward flow of the influent and can be any organic carbon-containing or sulphur containing material able to support microbially assisted de-nitrification. It allows the nitrogen-containing species to react with the carbon and/or carbon-containing compounds in the media 228. A variety of carbon source materials can be used including, but not limited to, organic alcohols, ground organic solids, including corn, grains and wood products, seaweed, coconut husks, elemental carbon, and mixtures thereof. In one configuration, the media 228 is formed from a particulate material, at least most of which have a particle size distribution ranging from about ⅛" to about 2" inches.

The separator 232 (which is optional) limits intermixing of the granular media in the distribution system 124 with the overlying de-nitrification media 228 and can contribute to establishing a uniform flow of the influent through the media 228. The separator 232 can, for example, be a screen, sieve, or other material as required by the utilized carbon source. When the separator 232 is a screen or sieve, the pore size of the screen or sieve is preferably smaller than one or both of the sizes of the de-nitrification and porous distribution media.

The de-nitrified effluent collection system 132 includes a plurality of substantially parallel and spaced-apart flow collection conduits 236a-j connected to a collection manifold 240, all of which are contained within a porous collection media 244. In one configuration, each of the conduits 236a-j includes a plurality of spaced-apart collection ports (not shown). In one configuration, the conduits 236a-j are perforated pipes. In another configuration, the conduits 236a-j include spaced-apart collection ports, commonly having a spacing similar to that of the distribution ports 220.

The various components of the collection system 132 are typically not chemically reactive with, or are inert to, the de-nitrified effluent. Commonly, the manifold 240 and conduits 236a-j are composed of any of the materials noted above in connection with the distribution system 124. The porous collection media can be any of the materials noted above in connection with the porous distribution media 216.

In one particular implementation, the spacing $S_{CC}$ between adjacent collection conduits 236a-j is within the range specified above for the distribution conduits 204a-i. The diameter of the conduits 236a-i preferably ranges from about 2 to about 4 inches. The distribution size of at least most of the porous media 244 preferably ranges from about 0.5 to about 2.0 inches but can be outside of this range depending on the material used for the media.

With reference to FIG. 2, the distribution and collection conduits 204 and 236 are typically arranged in an interlaced or interdigitated configuration. Stated another way, a distribution conduit 204 is posited between adjacent collection conduits 236, and a collection conduit 236 between adjacent distribution conduits 204. This can provide a more effective arrangement for collecting the de-nitrified effluent.

While the collection system 132 has been described with reference to a particular configuration, it is to be appreciated that other configurations are possible. For example, more or fewer conduits 236 and/or discharge ports may be employed. The collection and discharge conduits can be vertically aligned, or positioned one on top of the other. The free ends of each conduit 236 can be connected to a second manifold. All such variations are considered to part of the current invention.

The containment system 208 includes side walls 248a-d, bottom wall 252, and an impermeable and impervious liner 256 positioned between and enclosing the distribution, de-nitrification, and collection systems 124, 128, and 132. The side and bottom walls 248a-d and 252 can be constructed of any material able to support structurally the enclosed systems 124, 128, and 132. For example, the side and bottom walls can be constructed of impermeable and/or otherwise impervious soils, wood, steel, brick or masonry walls, concrete, adobe, or other material that provides structural stability. The liner 256 acts as a sealing layer to prevent liquids or air from leaking into or out of the sides of the de-nitrification system 128. In one configuration, it is constructed of one or more of polyvinyl chloride, polyethylene, or other plastic or rubber lining materials, sprayed or brushed on polymers, or other suitable sealants. In one implementation, the liner 256 is a 40 mil EPDM or HDPE impermeable liner.

Figure 3:
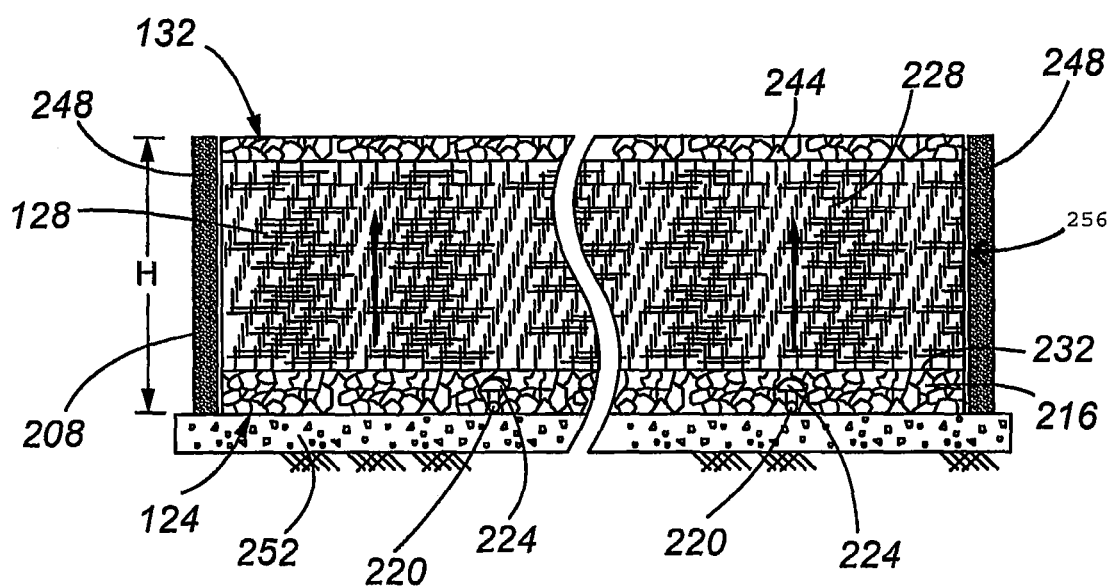
FIG. 3 is a flow chart according to an embodiment.

The dimensions of the de-nitrification assembly 200 vary depending on the application. With reference to FIG. 3, the height of the porous distribution media 216 typically ranges from about 6 to about 12 inches of the total height "H" of the assembly 200; the height of the de-nitrification media 228 from about 6 to about 10 feet of the total height "H"; and the height of the collection media 244 about 6 to about 12 inches of the total height "H". The lengths and widths of the volumes of each of the media 216, 228, and 244 are substantially identical.

While the containment system 208 has been described with reference to a particular configuration, it is to be appreciated that other configurations are possible. For example, the function of the liner 256 may be incorporated into the surrounding walls. For instance, a substantially impermeable aggregate, such as concrete or cement, can be used to enclose the sides and bottom of the various systems 124, 128, and 132. The upper surface of the collection system 132 may be open to the atmosphere, covered with soil, or covered by an impermeable material; that is, the various systems 124, 128 and 132 can be enclosed fully by an impermeable barrier to entry by terrestrial liquids and air. In this configuration, however, the nitrogen gas byproduct of microbial de-nitrification needs to be vented into the atmosphere. All such variations are considered to part of the current invention.

The operation of the de-nitrification system will now be described with reference to FIGS. 1-3.

The influent 100 is commonly derived from a wastewater treatment unit, after some form of advanced treatment in which BOD and TSS reduction and nitrification of ammonia has taken place.

The influent 100 is treated in step 104 to remove preferably at least most and even more preferably at least about 90% of the Biochemical Oxygen Demand (BOD), at least about 80% Total Suspended Solids (TSS), and ammonia. The influent 100 preferably has been subjected to nitrification. As a result, most of the nitrogen species in the influent 100 are commonly in the form of nitrates. A common concentration of nitrates in the influent 100 ranges from about 20 to about 70 mg/L.

The influent 100 is conveyed by open channel or piping to an analytical testing station 108. The piping is commonly low pressure piping or gravity piping. The pressure commonly ranges from about 25 to about 50 psi. Based on the results of the on-going testing performed by the analytical testing station, certain chemicals may be injected into the influent 100 by a chemical mixing section (step 112) to ensure substantially optimum conditions for de-nitrification. In most applications, optimal conditions include a pH ranging from about pH 6.5 to about pH 8 and a dissolved molecular oxygen concentration of no more than about 1 mg/L.

The chemicals normally include a pH adjustor (step 116) or molecular oxygen scavenger (step 120). The pH adjustor may be an acid or base. Exemplary acids include mineral acids, and exemplary bases include carbonates (e.g., limestone), hydroxides, and oxides (e.g., lime), and mixtures thereof. The molecular oxygen scavenger can be any element or compound for destroying or binding with molecular oxygen.

From the testing station 108 and chemical treatment stage 112, the influent is pumped to the de-nitrification assembly 200. The assembly 200 includes the treated influent distribution, de-nitrification, and de-nitrified effluent collection systems 124, 128, and 132. As noted, an anoxic environment is required to optimize the biological de-nitrification process. The treated influent is delivered through the distribution system 124 under pressure to the de-nitrification system 128, commonly utilizing mechanical pumps. The treated influent feeds from the distribution conduits 204a-i into the bottom of the assembly 200 (as depicted by the upward arrows in FIG. 3) and flows upward through, and fluidizes, the porous distribution, de-nitrification, and collection media 216, 228, and 244 and into the collection conduits 236a-j. Although a fixed bed of organic material may be employed, a fluidized bed is preferred. The de-nitrified effluent from the de-nitrification system 128 is collected into the collection conduits 236a-j that may be covered with an impermeable material or placed in a tank underground to prevent the leakage of air, containing gaseous oxygen, into the de-nitrification reaction zone.

The collection system 132 may provide the collected de-nitrified effluent to a de-nitrified effluent quality testing station 136. The station 136 periodically or continuously tests the effluent and determines whether the nitrogen concentration of the effluent complies with predetermined water quality standards. As noted, the end products of the overall de-nitrification reactions are nitrogen gas, carbon dioxide gas, water, and an increase in water alkalinity.

Typically most, more typically about 75% or more, and even more typically about 90% or more of the speciated nitrogen (particularly in the form of nitrates) in the treated influent discharged into the assembly 200 are converted into nitrogen gas. The assembly 200 can treat the wastewater from raw sewage through ultimate disposal and comply with nitrogen standards requiring the total nitrogen limits to be reduced to concentrations below 10 mg/l.

The discharged effluent 140 commonly has significantly lowered carbon levels, suspended solids, and nitrogen concentrations and is ready to be released for final disposal.

The de-nitrification system 200 is formed typically underground. In a common implementation, the underground excavation is formed using earth moving equipment; the containment system positioned in the underground excavation; the distribution system positioned in the containment system; the separator 232 positioned on an upper surface of the distribution system; the de-nitrification system positioned on the separator; the collection system positioned on the upper surface of the media 228; a pump connected to the distribution system to pressurize the stream and cause the stream to pass through the de-nitrification media, thereby converting at least most of the nitrates into nitrogen gas and forming a treated stream, and finally soil backfilled around the periphery of the containment system.

A number of variations and modifications of the invention can be used. It would be possible to provide for some features of the invention without providing others.

For example in one alternative embodiment, the de-nitrification assembly 200 can be used to de-nitrify wastewaters from sources other than from advanced treatment systems.

In another alternative embodiment, a porous and permeable separator is positioned at the interface between the de-nitrification media 228 and collection media 244. The separator, which has a similar construction to the separator 232, has a pore size that is smaller than the size of at least most of the media 228.

In yet another alternative embodiment, the distribution conduits 204a-i are porous pipes similar to the collection conduits 236a-j.

The present invention, in various embodiments, configurations, or aspects, includes components, methods, processes, systems and/or apparatus substantially as depicted and described herein, including various embodiments, configurations, aspects, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   receiving an aqueous stream comprising nitrates;
   introducing the aqueous stream into a containment system, the containment system comprising:
      a particulate bed of an organic carbon-containing de-nitrification media as an organic carbon source for the conversion of nitrates to nitrogen gas and form a de-nitrified aqueous stream;
      a fluid distribution layer located beneath the bed of carbon-containing de-nitrification media to distribute, substantially uniformly, the aqueous stream over a face of the bed of carbon-containing de-nitrification media, the carbon containing denitrification media being spaced, by the fluid distribution layer, from a bottom of the containment system; and
      a fluid collection layer, located above the bed of carbon-containing de-nitrification media, to collect the de-nitrified aqueous stream;
   upflowing the aqueous stream through the bed of carbon-containing de-nitrification media to convert at least most of the nitrates into nitrogen gas and form the de-nitrified aqueous stream; and
   removing the de-nitrified aqueous stream from the containment system.

2. The method of claim 1, wherein the aqueous stream is introduced under pressure into the containment system, wherein the fluid distribution and collection layers comprises an aggregated material, and wherein the walls and bottom of the containment system are substantially impervious to water.

3. The method of claim 1, wherein the fluid distribution and collection layers comprises an aggregated material, wherein the containment system comprises wall and bottom members and an impervious liner, the liner being substantially impervious to molecular oxygen and water, and wherein the impervious liner is positioned between the wall and bottom members and the bed of de-nitrification media.

4. The method of claim 1, wherein the fluid distribution and collection layers comprises an aggregated material, wherein the containment system comprises a distribution system in the fluid distribution layer to introduce the aqueous stream into the containment system, a porous separator, and a collection system in the fluid collection layer, wherein the distribution and collection systems each comprise a porous media surrounding a plurality of conduits, wherein the separator is positioned between the distribution system and the bed of de-nitrification media, wherein the separator comprises a plurality of pores smaller than a size of at least most of the de-nitrification media.

5. The method of claim 4, wherein the collection and distribution conduits are vertically positioned relative to one another in an interdigitated arrangement.

6. The method of claim 5, wherein the fluid distribution and collection layers comprises an aggregated material, wherein an upper portion of the containment system is covered by a lid that is vented to the atmosphere, wherein a thickness of the fluid distribution layer ranges from about 6 to about 12 inches, wherein a spacing between adjacent distribution conduits and between adjacent collection conduits ranges from about 2 to about 4 feet, wherein an influent pressure of the aqueous stream ranges from about 15 to about 40 psi, wherein an influent flow rate of the aqueous stream ranges from about 10 to about 45 gal/min, and wherein a distribution size of at least most of the aggregated material in the distribution layer ranges from about 0.5 to about 2.0 inches.

7. The method of claim 1, further comprising:
   inhibiting a passage of the stream from an interior of the containment system, through the containment system, and into surrounding soil and terrestrial fluids from the surrounding soil, through the containment system, and into the interior of the containment system.

8. An apparatus, comprising:
   an aggregate distribution system operable to introduce an aqueous stream comprising nitrates;
   a bed of organic carbon-containing de-nitrification system comprising particles of an organic carbon-containing de-nitrification media, the media providing an organic carbon source for the conversion of nitrates into nitrogen gas to form a treated stream;
   a pump operable to pressurize the aqueous stream and cause the aqueous stream to pass through the bed of de-nitrification media, thereby converting at least most of the nitrates into nitrogen gas and forming the treated stream; and
   an aggregate collection system operable to remove the treated stream.

9. The apparatus of claim 8, wherein the aggregate distribution and collection systems and the bed of organic carbon-containing de-nitrification media are surrounded by sidewalls and a bottom, the sidewalls and bottom being substantially impermeable to a passage of water, wherein a distribution size of at least most of the particles in the aggregate distribution system ranges from about 0.5 to about 2.0 inches, wherein an influent pressure of the aqueous stream ranges from about 15 to about 40 psi, and wherein an influent flow rate of the aqueous stream ranges from about 10 to about 45 gal/min.

10. The apparatus of claim 9, wherein a water impervious liner is positioned between the sidewalls and bottom members and the bed of organic carbon-containing de-nitrification media.

11. The apparatus of claim 10, wherein an upper portion of the containment system is open to the atmosphere.

12. The apparatus of claim 9, wherein the sidewalls and bottom are substantially impervious to the passage of molecular oxygen.

13. The apparatus of claim 8, wherein the distribution and collection systems each comprise a porous aggregate media surrounding a plurality of conduits, wherein a porous separator is positioned between the distribution system and the de-nitrification media, wherein the separator comprises a plurality of pores smaller than a size of at least most of the de-nitrification media.

14. The apparatus of claim 13, wherein the collection and distribution conduits are vertically positioned relative to one another in an interdigitated arrangement, wherein a spacing between adjacent distribution conduits and between adjacent collection conduits ranges from about 2 to about 4 feet, wherein an influent pressure of the aqueous stream ranges from about 15 to about 40 psi, wherein an influent flow rate of the aqueous stream ranges from about 10 to about 45 gal/min, and wherein a distribution size of at least most of the particles in the aggregate distribution system ranges from about 0.5 to about 2.0 inches.

15. The apparatus of claim 8, wherein the containment system is further operable to inhibit a passage of the stream from an interior of the containment system, through the containment system, and into surrounding soil and terrestrial fluids from the surrounding soil, through the containment system, and into the interior of the containment system.

16. A method, comprising:
forming an underground excavation;
positioning a containment system in the underground excavation, the containment system comprising sidewalls and a bottom that are substantially impermeable to a passage of water;
positioning, in the containment system, an aggregate distribution system operable to introduce an aqueous stream comprising nitrates into the containment system;
positioning, in the containment system, a particulate bed of organic carbon-containing de-nitrification system comprising an organic carbon-containing de-nitrification media, the media being contained within the containment system;
operably connecting, to the aggregate distribution system, a pump operable to pressurize the stream and cause the stream to pass through the de-nitrification media, thereby converting at least most of the nitrates into nitrogen gas and forming a treated stream; and
positioning, in the containment system, an aggregate collection system operable to remove the treated stream from the containment system.

17. The method of claim 16, wherein the containment system comprises at least one wall member and a bottom member and an impervious liner and wherein the impervious liner is positioned between the at least one wall and bottom members and the de-nitrification media.

18. The method of claim 17, wherein an upper portion of the containment system is open to the atmosphere.

19. The method of claim 16, wherein the aggregate distribution and collection systems each comprise a porous media surrounding a plurality of conduits, wherein a porous separator is positioned between the aggregate distribution system and the de-nitrification media, wherein the separator comprises a plurality of pores smaller than a size of at least most of the de-nitrification media.

20. The method of claim 19, wherein the collection and distribution conduits are vertically positioned relative to one another in an interdigitated arrangement, wherein a spacing between adjacent distribution conduits and between adjacent collection conduits ranges from about 2 to about 4 feet, wherein an influent pressure of the aqueous stream ranges from about 15 to about 40 psi, wherein an influent flow rate of the aqueous stream ranges from about 10 to about 45 gal/min, and wherein a distribution size of at least most of the particles in the aggregate distribution system ranges from about 0.5 to about 2.0 inches.

21. The method of claim 16, wherein the containment system substantially inhibits passage of the stream from an interior of the containment system, through the containment system, and into surrounding soil and terrestrial fluids from the surrounding soil, through the containment system, and into the interior of the containment system.

22. The method of claim 16, wherein the sidewalls and bottom of the containment system are substantially impervious to the passage of molecular oxygen.

* * * * *